US012677039B2

(12) United States Patent
Li et al.

(10) Patent No.: US 12,677,039 B2
(45) Date of Patent: Jul. 7, 2026

(54) METHOD, APPARATUS, COMPUTER DEVICE, AND STORAGE MEDIUM FOR PRESENTING INFORMATION

(71) Applicant: Beijing Zitiao Network Technology Co., Ltd., Beijing (CN)

(72) Inventors: Xiaojie Li, Beijing (CN); Rongqiang Huang, Beijing (CN); Shuanghua Wang, Beijing (CN); Huapeng Yang, Beijing (CN); Rongchao Huang, Beijing (CN); Peiyu Zhong, Beijing (CN); Ning Gong, Beijing (CN); Wei Zeng, Beijing (CN); Kun Liu, Beijing (CN); Zhifeng Yao, Beijing (CN); Liangjie Xie, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/861,374

(22) PCT Filed: Aug. 21, 2023

(86) PCT No.: PCT/CN2023/114115
§ 371 (c)(1),
(2) Date: Oct. 29, 2024

(87) PCT Pub. No.: WO2024/046164
PCT Pub. Date: Mar. 7, 2024

(65) Prior Publication Data
US 2025/0337985 A1      Oct. 30, 2025

(30) Foreign Application Priority Data

Aug. 30, 2022    (CN) .......................... 202211044363.6

(51) Int. Cl.
| | |
|---|---|
| H04N 21/466 | (2011.01) |
| G06F 3/0483 | (2013.01) |
| H04N 21/431 | (2011.01) |

(52) U.S. Cl.
CPC ....... H04N 21/4668 (2013.01); G06F 3/0483 (2013.01); H04N 21/4316 (2013.01)

(58) Field of Classification Search
CPC ........... H04N 21/4668; H04N 21/4316; G06F 3/0483
See application file for complete search history.

(56) References Cited

U.S. PATENT DOCUMENTS 9,792,003 B1 *  10/2017  Story, Jr. ............. G06F 16/9535
2011/0099002 A1 *  4/2011  Sasaki ................ H04N 1/00251
                                                704/E11.001
(Continued)

FOREIGN PATENT DOCUMENTS

CN      107357494 A      11/2017
CN      107562680 A      1/2018
(Continued)

OTHER PUBLICATIONS

International Search Report received for PCT Patent Application No. PCT/CN2023/114115, mailed on Nov. 17, 2023, 5 pages (2 pages of English Translation and 3 pages of Original Document).
(Continued)

*Primary Examiner* — Oschta I Montoya

(57) ABSTRACT

The present disclosure provides an information display method and apparatus, a computer device, and a storage medium. The method comprises: playing a target video, and displaying book information of at least one book, wherein the at least one book comprises a first book matching the content of the target video and/or a second book associated with the first book; and in response to a reading trigger (Continued)

operation for the book information, displaying a book reading page corresponding to the book information.

20 Claims, 5 Drawing Sheets

(56)                    References Cited

U.S. PATENT DOCUMENTS

| | | | |
|---|---|---|---|
| 2014/0068430 A1* | 3/2014 | Wu | G06Q 30/0631 |
| | | | 715/277 |
| 2014/0237344 A1* | 8/2014 | Murata | G06F 16/34 |
| | | | 715/230 |
| 2015/0339400 A1* | 11/2015 | Choi | G06F 3/04842 |
| | | | 715/747 |
| 2017/0242833 A1* | 8/2017 | Rakshit | G06V 40/20 |

FOREIGN PATENT DOCUMENTS

| | | |
|---|---|---|
| CN | 109977266 A | 7/2019 |
| CN | 111782873 A | 10/2020 |
| CN | 113961794 A | 1/2022 |
| CN | 114595384 A | 6/2022 |
| CN | 114860919 A | 8/2022 |
| CN | 114880458 A | 8/2022 |
| CN | 115357753 A | 11/2022 |

OTHER PUBLICATIONS

Office action received from Chinese patent application No. 202211044363.6 mailed on Mar. 19, 2024, 31 pages (20 pages English Translation and 11 pages Original Copy).

* cited by examiner

S101

PLAY A TARGET VIDEO, AND PRESENT BOOK INFORMATION OF AT LEAST ONE BOOK; WHEREIN THE AT LEAST ONE BOOK INCLUDES A FIRST BOOK MATCHING A CONTENT OF THE TARGET VIDEO, AND/OR A SECOND BOOK ASSOCIATED WITH THE FIRST BOOK

S102

IN RESPONSE TO A READING TRIGGER FOR THE BOOK INFORMATION, PRESENT A BOOK READING PAGE CORRESPONDING TO THE BOOK INFORMATION

METHOD, APPARATUS, COMPUTER DEVICE, AND STORAGE MEDIUM FOR PRESENTING INFORMATION

This application is a national stage of International Application No. PCT/CN2023/114115 filed on Aug. 21, 2023, which is based on and claims priority to Chinese Patent Application No. 202211044363.6 filed on Aug. 30, 2022. Both of the aforementioned applications are incorporated by reference herein in their entireties.

FIELD

The present disclosure relates to the technical field of computers, and more particularly, to a method, an apparatus, a computer device and a storage medium for presenting information.

BACKGROUND

When a book is recommended to a user, the book is usually introduced with a text and a picture. For example, a brief introduction and a cover of the book are used as recommendation information of the book, and the recommendation information is presented to the user.

By recommending books with the text and picture, the user's reading effort for the recommendation information is high, and the efficiency of finding the interested books is low.

SUMMARY

Embodiments of the present disclosure at least provide a method, an apparatus, a computer device and a storage medium for presenting information.

According to a first aspect, embodiments of the present disclosure provide a method for presenting information, including: playing a target video, and presenting book information of at least one book; and in response to a reading trigger for the book information, presenting a book reading page corresponding to the book information. The at least one book includes a first book matching a content of the target video, and/or a second book associated with the first book.

In an alternative implementation, the first book matching the content of the target video is determined by: extracting content-related information of the target video; and matching the content-related information with the book information of each book in the book library to determine the first book matching the content of the target video. The content-related information includes at least one of title information, comment information, copy information, or content recognition information of the target video.

In an alternative implementation, the second book associated with the first book is determined by: determining, in a book library, a book with corresponding target attribute information matching target attribute information of the first book as the second book; and/or determining a topic to which the first book belongs and determining a book under the topic in the book library as the second book.

In an alternative implementation, the at least one book is a single book. The method further includes in response to a target trigger on a page on which the target video is played, presenting a recommended book window; and presenting, in the recommended book window, book introduction information of the single book, and in response to presence of film and television resource information matching the single book, presenting the film and television resource information.

In an alternative implementation, the at least one book includes a plurality of books. The method further includes in response to the presented plurality of books matching a plurality of books under a target topic, presenting the target topic on a page on which the target video is played; and in response to a trigger for the target topic, presenting a plurality of topic posts under the target topic. The topic posts include discussion information for a book under the target topic.

In an alternative implementation, presenting the target topic on the page on which the target video is played includes presenting, on the page on which the target video is played, title information of the target topic and book recommendation information extracted from the plurality of topic posts under the target topic.

In an alternative implementation, the method further includes in response to a target trigger on the page on which the target video is played, presenting a recommended book window; and presenting, in the recommended book window, book covers of a plurality of books associated with the target topic and book introduction information of a selected book in the plurality of books.

In an alternative implementation, playing the target video includes in response to a trigger on a video preview card of the target video presented on a recommendation page, playing the target video. The recommendation page presents video preview cards of a plurality of recommendation videos including the video preview card of the target video. An arrangement order between the video preview cards of the plurality of recommendation videos is related to consumption data of books respectively associated with the plurality of recommendation videos. The video preview card presents video preview information of the target video and book recommendation information of at least one book associated with the target video.

According to a second aspect, embodiments of the present disclosure further provide an apparatus for presenting information, including: a first presenting module configured to play a target video and present book information of at least one book; and a second presenting module configured to in response to a reading trigger for the book information, present a book reading page corresponding to the book information. The at least one book includes a first book matching a content of the target video, and/or a second book associated with the first book.

In an alternative implementation, the first book matching the content of the target video is determined by: extracting content-related information of the target video; and matching the content-related information with the book information of each book in the book library to determine the first book matching the content of the target video. The content-related information includes at least one of title information, comment information, copy information, or content recognition information of the target video.

In an alternative implementation, the second book associated with the first book is determined by: determining, in a book library, a book with corresponding target attribute information matching target attribute information of the first book as the second book; and/or determining a topic to which the first book belongs and determining a book under the topic in the book library as the second book.

In an alternative implementation, the at least one book is a single book. The information presenting module further includes a first processing module. The first processing module is configured to: in response to a target trigger on a page on which the target video is played, present a recommended book window; and present, in the recommended book window, book introduction information of the single book, and in response to presence of film and television resource information matching the single book, present the film and television resource information.

In an alternative implementation, the at least one book includes a plurality of books. The information presenting module further includes a second processing module. The second processing module is configured to: in response to the presented plurality of books matching a plurality of books under a target topic, present the target topic on a page on which the target video is played; and in response to a trigger for the target topic, present a plurality of topic posts under the target topic. The topic posts include discussion information for a book under the target topic.

In an alternative implementation, when the second processing module presents the target topic on the page on which the target video is played, the second processing module is configured to: present, on the page on which the target video is played, title information of the target topic and book recommendation information extracted from the plurality of topic posts under the target topic.

In an alternative implementation, the second processing module is further configured to: in response to a target trigger on the page on which the target video is played, present a recommended book window; and present, in the recommended book window, book covers of a plurality of books associated with the target topic and book introduction information of a selected book in the plurality of books.

In an alternative implementation, the first presenting module is configured to, when the target video is played, in response to a trigger on a video preview card of the target video presented on a recommendation page, play the target video. The recommendation page presents video preview cards of a plurality of recommendation videos including the video preview card of the target video. An arrangement order between the video preview cards of the plurality of recommendation videos is related to consumption data of books respectively associated with the plurality of recommendation videos. The video preview card presents video preview information of the target video and book recommendation information of at least one book associated with the target video.

According to a third aspect, an alternative implementation of the present disclosure further provides a computer device, including a processor and a memory. The memory stores machine readable instructions executable by the processor, the processor is configured to execute the machine readable instructions stored in the memory. The machine readable instructions, when executed by the processor, the acts of the first aspect or any possible implementations of the first aspect are performed.

According to a fourth aspect, an alternative implementation of the present disclosure further provides a computer-readable storage medium. The computer-readable storage medium stores a computer program, and when the computer program is executed, the acts of the first aspect or any possible implementations of the first aspect are performed.

With the method, the apparatus, the computer device and the storage medium for presenting information according to embodiments of the present disclosure, the recommendation information of the book is carried through the medium of the video information. Specifically, by presenting the book information of the book that matches the content of the target video when the target video is played, the user may learn about the related content of the book while viewing the video. Compared with the way in which the user actively reads the text and picture, this way in which the user directly views the played video has lower reading effort. Therefore, in this way, the user may find the interested book with high efficiency. Moreover, for the interested book, the book information of the book may be directly triggered to enter the book reading page for reading, which improves the efficiency of book reading.

In order to make the above objectives, features and advantages of the present disclosure more comprehensible, the following detailed description is given below with reference to the accompanying drawings.

BRIEF DESCRIPTION OF DRAWINGS

In order to more clearly illustrate the technical solutions of the embodiments of the present disclosure, the accompanying drawings, which need to be used in the embodiments, are briefly introduced below, and the drawings herein are incorporated into the specification and constitute a part of the present specification. These drawings illustrate embodiments consistent with the present disclosure, and are used together with the specification to explain the technical solutions of the present disclosure. It should be understood that the following drawings illustrate only certain embodiments of the present disclosure, and therefore should not be regarded as limiting the scope, and for those skilled in the art, other related drawings may also be obtained according to these drawings without creative work.

DETAILED DESCRIPTION

Figures 1, 2:
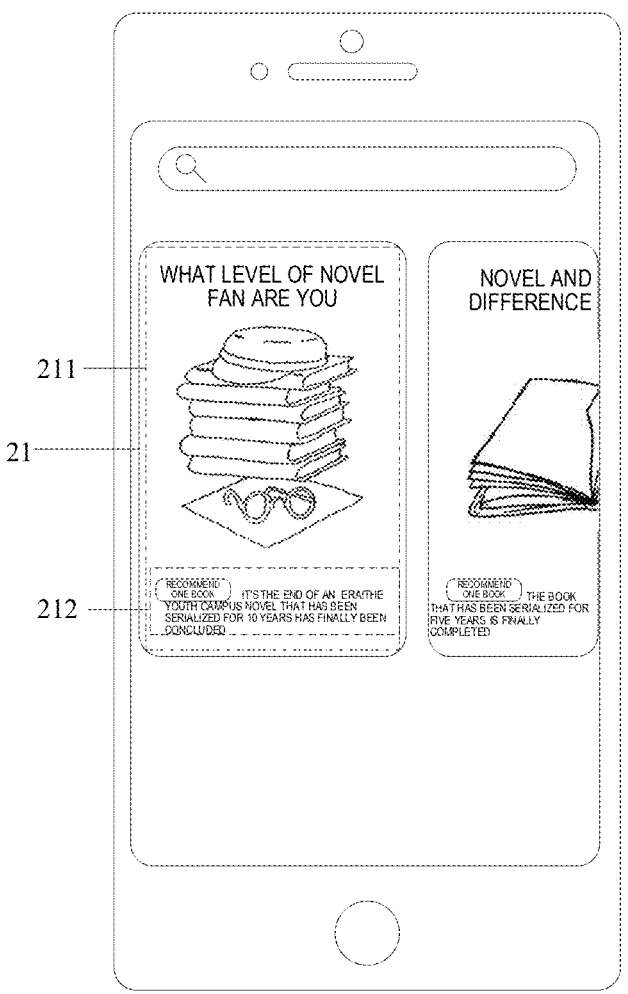
FIG. 1 illustrates a flowchart of a method for presenting information according to an embodiment of the present disclosure.
FIG. 2 illustrates a schematic diagram of a recommendation page according to an embodiment of the present disclosure.

In order to make the objectives, technical solutions and advantages of embodiments of the present disclosure clearer, the technical solutions in the embodiments of the present disclosure will be clearly and completely described below with reference to the accompanying drawings in the embodiments of the present disclosure. Obviously, the described embodiments are only a part of embodiments of the present disclosure, not all of them. The components of the embodiments of the present disclosure generally described and illustrated herein may be arranged and designed in a variety of different configurations. Therefore, the following detailed description of embodiments of the present disclosure is not intended to limit the scope of the claimed disclosure, but merely to represent selected embodiments of the present disclosure. All other embodiments obtained by those skilled in the art without creative efforts shall fall within the scope of the present disclosure.

Through research, it has been found that when a book is recommended to the user, the text and the book cover are usually used as the recommendation information of the book. The recommendation information of the text and the book cover may make the user's reading effort high, and the willingness of active reading low. Therefore, in this information presentation mode, the efficiency of the user finding the interested book is low.

Based on the above research, embodiments of the present disclosure provide a method for presenting information. The recommendation information of the book is carried through the medium of the video information. Specifically, by presenting the book information of the book that matches the content of the target video when the target video is played, the user may learn about the related content of the book while viewing the video. Compared with the way in which the user actively reads the text and the picture, this way in which the user directly views the played video has lower reading effort. Moreover, for the interested book, the book information of the book may be directly triggered to enter the book reading page for reading, which improves the efficiency of book reading.

The defects of the above solutions are all the results obtained by the inventor after practice and careful study. Therefore, the discovery process of the above problems and the solutions for the problems proposed by the present disclosure below should be the contributions made by the inventor to the present disclosure in the process of the present disclosure.

It should be noted that like numerals and letters refer to like items in the following drawings. Therefore, once a certain item is defined in a figure, it does not need to be further defined and explained in subsequent figures.

To facilitate understanding of the embodiments, the method for presenting information according to the embodiments of the present disclosure will first be described in detail. The executing body of the method for presenting information according to embodiments of the present disclosure is generally a computer device having a certain computing capability. The computer device includes, for example, a terminal device or a server or other processing device. The terminal device may be a user equipment (UE), a mobile device, a user terminal, a terminal, a cellular phone, a cordless phone, a personal digital assistant (PDA), a handheld device, a computing device, a vehicle-mounted device, a wearable device, and the like. In some possible implementations, the method for presenting information may be implemented by a processor calling computer readable instructions stored in a memory.

The method for presenting information according to embodiments of the present disclosure will be described below.

A flowchart of a method for presenting information according to an embodiment of the present disclosure is illustrated in FIG. 1. The method includes blocks S101 and S102.

At block S101, a target video is played, and book information of at least one book is presented. The at least one book includes a first book matching a content of the target video, and/or a second book associated with the first book.

At block S102, a book reading page corresponding to the book information is presented in response to a reading trigger for the book information.

The blocks S101 and S102 will be described in detail below.

For the above block S101, in the embodiment of the present disclosure, the video is used as the medium, and the matched book information is added to the target video related to the book information. The target video may include a plurality of types of videos, such as user-created videos for recommending books, user-remade creative videos of the book, clip videos of film and television works associated with the book, and official recommendation videos.

In a possible case, the target video may be selected in the recommendation page. For example, a schematic diagram of a recommendation page according to an embodiment of the present disclosure is illustrated in FIG. 2. When the target video is played, the target video may be played in response to a trigger on a video preview card of the target video presented on the recommendation page. In the illustrated recommended page, video preview cards (such as the video preview card 21 in FIG. 2) of a plurality of recommended videos including the video preview card of the target video are presented. In the example, the plurality of video preview cards is presented horizontally, and in response to the user's left and right sliding, other video preview cards not illustrated may be presented.

Specifically, the arrangement order between the video preview cards of the plurality of recommendation videos may be related to consumption data of books respectively associated with the plurality of recommendation videos. The consumption data may include consumption data of the book itself, for example, the book's reading volume, the book's purchasing volume, the discussion volume of topics including the book, etc. The consumption data may further include the consumption conversion rate of reading the associated book after viewing the recommended video. The consumption conversion rate here indicates the ratio of the number of people who read the associated book after viewing the recommended video.

In addition, in the video preview card, video preview information of each recommended video and book recommendation information of at least one book associated with each recommended video may further be presented. For details, reference may be made to the video preview information 211 and the book recommendation information 212 in the video preview card 21 of the recommended video in FIG. 2. In a possible case, the book recommendation information may be presented suspended on the video preview information in a non-fully transparent form, to reduce obstruction of the video preview information. In addition, the video preview information may be a frame of video frame image in the recommendation video, or a cover image uploaded by the user who uploaded the recommendation video, or a frame of video frame image selected after recognition (such as speech recognition, image recognition, text recognition, etc.) is performed on the recommendation video, and the information recognized in the frame of video frame image has a relatively high correlation with the associated book information.

In a possible case, the target video may only be associated with one book. For example, the target video includes a video for introducing for a specific book, and the associated book may include only the specific book. Alternatively, the target video may be a video that introduces a category of books. For example, it may introduce a plurality of currently popular fantasy novels, or a plurality of books created by a certain author. Correspondingly, the target video may be associated with a plurality of fantasy novels or a plurality of works created by the author. In FIG. 2, for example, when the recommended video corresponding to the video preview card 21 is taken as the target video, the target video is only associated with one book, thus the book recommendation information 212 only includes the book recommendation information corresponding to one book. When the target video is associated with a plurality of books, the plurality of books may be presented on the video preview card in the arrangement presentation manner. In order to prompt the user about the number of recommended books in the target video, the number of recommended books may be specifically marked on the video preview card. For example, in FIG. 2, there is an annotation of "recommend one book" before the book recommendation information 212.

When the selected target video is determined, based on the target video, a first book matching the content included in the target video may be determined.

In some embodiments, the first book matching the content of the target video may be determined by: extracting content-related information of the target video; and matching the content-related information with the book information of each book in the book library to determine the first book matching the content of the target video. The content-related information includes at least one of title information, comment information, copy information, or content recognition information of the target video.

For example, for the content-related information of the target video, the included title information of the target video may be title information set when the target video is uploaded. The comment information may be determined based on information in real-time comments, including information in the pinned comment of the video creator and information sent by other users. In a possible case, by performing semantic recognition on information such as text in the comment information, information such as the book title, the character's names in the book, the author's name, and the plots involved in the book mentioned therein may be obtained. The copy information may be, for example, introduction information set when the target video is uploaded. The content recognition information may be the content recognition result obtained after the text information, the voice information, and the video frame image in the target video are recognized according to recognition methods such as optical character recognition.

When the content-related information of the target video is extracted, the first book matching the content of the target video may be determined by matching the content-related information with the book information of respective books in the book library.

The book library may pre-store a plurality of books, and each book has corresponding book information. The book information of the book may be specifically used for distinguishing from other books, and the information of a book may be uniquely determined by combination of at least one book information. For example, the book information of the book may include the book category, the book title, the author's name, the name of the protagonist in the book, etc. For example, for a certain novel, its book information of the book category, the book title, the author's name and the name of the protagonist in the book may include the fantasy novel, the "Novel A", the author A and the protagonist B. When the book library stores a plurality of books, the book information may be used as indexes, such that when the first book is matched from the book library with the content-related information of the target video, the book matching may be performed efficiently according to the index information.

By way of example, when only one book is introduced in the target video, for example, the author's name and the book title of the book are extracted in the target video. For example, with the determined author's name and the book title, one book may be uniquely determined in the book library, and the book may be taken as the first book matching the content of the target video. When the author's name or a plurality of books created by the certain author are introduced in the target video, for example, the author's name, or the author's name and a plurality of books created by the author may be extracted in the target video. For example, when the author's name is extracted in the target video, all the books created by the author may be determined in the book library with the author's name. For example, when the author's name and a plurality of books created by the author are extracted in the target video, a plurality of books mentioned in the target video may be matched in the book library by using the author's name and the plurality of books created by the author. In both cases, the content of the target video may be matched to a plurality of first books. That is, the first book matching the content of the target video may include one or more books, depending on the content extracted from the target video and the books stored in the book library.

In a possible case, in order to present more recommended books to the user through the target video, to enrich the presented information and enable the user to have more options for selecting books, in the case where the first book is determined, the second book associated with the first book may be further expanded and presented with the first book. The association between the second book and the first book may be to have the same attribute information or belong to the same topic. Specifically, in determining the second book associated with the first book, in the book library, a book corresponding to target attribute information matching the target attribute information of the first book may be determined as the second book; and/or the topic to which the first book belongs is determined, and the book under the topic in the book library is determined as the second book.

When the associated second book is determined for the first book with the target attribute information, the target attribute information of the first book may be, for example, a combination of at least one of attribute information corresponding to the book information of the first book. For example, the target attribute information may include the book category and the author or may include only the book category. For example, in the case where the target attribute information includes the book category and the author, when the book information of the first book under the target attribute information includes the fantasy novel and the author A, the second book matched in the book library with the target attribute information may include other books whose book information under the target attribute information is also fantasy novel and the author A, such as other fantasy novels created by the author A. Alternatively, in the case where the target attribute information only includes the book category, when the book information of the first book under the target attribute information includes the fantasy novel, the second book matched in the book library with the target attribute information may include other books whose book information under the target attribute information is also the fantasy novel.

According to the foregoing example, when the target attribute information includes attribute information in a plurality of dimensions, the number of second books that can be matched for the first book may be relatively small, or there may not be any second books that can be matched. When the target attribute information only includes attribute information in one dimension, there may be many books that can be matched, such as books of the same type. In fact, their correlation with the first book may be not high. Therefore, in determining the second book that matches the first book, when the target attribute information is selected for matching, it is possible to first determine the target attribute information with greater restrictions by combination. When no second book is matched, the combined attribute information in the target attribute information may be gradually reduced, to screen out a sufficient number of second books that have a relatively high correlation with the first book from the book library.

When the associated second book is determined for the first book with the topic, the topic to which the first book belongs may be determined first, and then the books mentioned in the topic are determined. The mentioned books in the book library are determined as the second book. The topic is generally discussed around common attribute characteristics of a category of books, and thus a plurality of books may be involved in the topic. Specifically, in the topic, the topic post in the topic is specifically created around the topic, enabling different users to comment and communicate about books involved in the topic. Therefore, the topic title or the topic post under the topic may include book information such as the book title, or the reading link of the book, etc. Therefore, with the determined first book, the topic that mentions the first book may be determined from a plurality of topics, and other books mentioned under the topic may be determined as the second book. Since the first book and the second book belong to the same topic, by determining the second book with the topic to which the first book belongs, the second book will also be more matchable with the first book.

In the case where the first book and the second book are determined in the foregoing manner, at least one book for which the corresponding book information is to be presented is determined.

Figure 3:
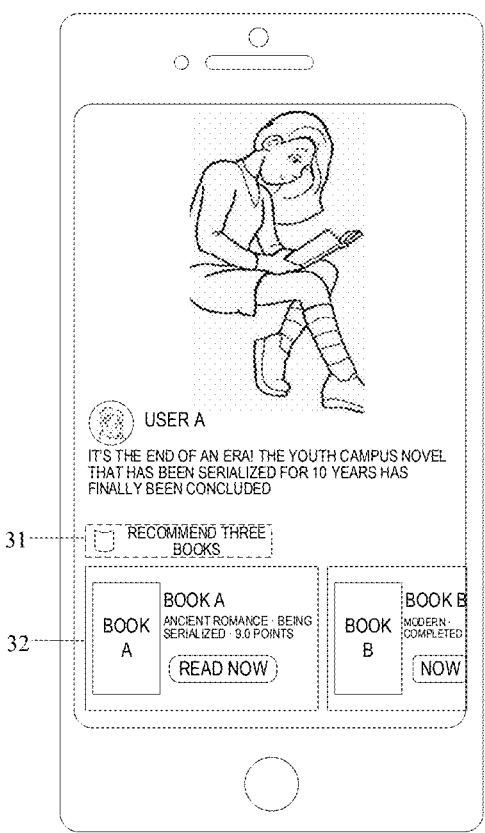
FIG. 3 illustrates a schematic diagram of a page for playing a target video according to an embodiment of the present disclosure.

For the selected target video and the determined at least one book, the book information of the at least one book may be presented while the target video is played. For example, a page for playing the target video according to an embodiment of the present disclosure is illustrated in FIG. 3. To facilitate distinguishing pages, it is also referred to as the video play page hereinafter. In a possible case, the target video and the book information of the at least one book may be presented in the same screen on the video play page, to intuitively present the book information corresponding to the book associated with the target video to the user while playing the target video.

For example, for the video play page illustrated in FIG. 3, the target video is played on the video play page, and the number of books of the at least one book and the book information card of each book are presented in the preset area. For example, in FIG. 3, the number of books is presented in the area 31, and the book information card 32 of each book is presented in the area below the area 31. The book information card presents the book information corresponding to the book, including the book cover, the book title, the book score, and the like. In addition, the video play page further presents a reading trigger button corresponding to the book. In this example, since the determined at least one book has three books, and the area where the book information card can be presented on the video play page is limited, the book information card arranged horizontally may be switched and presented on the video play page one by one in response to the left and right sliding of the user. The sliding mode here is merely an example, it may also be presented in a form of a list or the like, which is not limited herein.

In the case where the book information card of each book is presented in an arrangement presentation manner, when the determined at least one book includes a plurality of books, the arrangement order between the plurality of books may be obtained first, and then the book information cards of the plurality of books may be sequentially presented based on the determined arrangement order. The arrangement order is determined based on the matching degree between the plurality of books and the target video. In a possible case, when the determined at least one book includes the first book and the second book, since the first book is obtained by matching the target video, and the second book is obtained with the first book, it may be considered that the matching degree between the first book and the target video is greater than the matching degree between the second book and the target video. Thus, when a plurality of books is sorted, the first book may be arranged and presented before the second book. In addition, when the matching degree is determined, matching may be performed based on the book information of each book and the content-related information of the target video. The description of the book information and the content-related information may refer to the description of the foregoing corresponding parts. The related models for matching may be determined according to actual situations, and details are not described herein again.

In addition, in the case that at least one book is presented, in response to the target trigger, the recommended book window may be presented on the video play page. The user may view the book introduction information of the book in the recommended book window on the current page without jumping to the book reading page. The recommended book window is superimposed and presented on the video play page in a non-full-screen manner. For the video play page illustrated in FIG. 3, the target trigger may be, for example, the user's upward sliding near the area 31. The target trigger may be recognized as, for example, only presenting the recommended book window, rather than the sliding switch of the presented target video.

Figure 4:
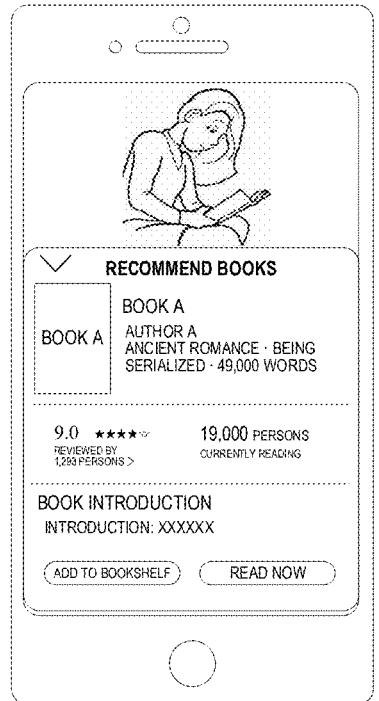
FIG. 4 illustrates a schematic diagram of a first recommended book window according to an embodiment of the present disclosure.

In a possible case, when the determined at least one book is a single book, for example, referring to FIG. 4, which is a schematic diagram of a first recommended book window according to an embodiment of the present disclosure. In the recommended book window, the book introduction information of the book is illustrated, including conventional book information such as the book cover, the book title, the author, the type and the like, and introduction information in more dimensions such as the current score, the number of readers and the book brief introduction, which is used to provide the user with more comprehensive and complete introduction to the book in multiple dimensions.

In addition, when the determined at least one book is a single book, it is determined whether there is the film and television resource matching the book. The film and television resource here may include, but is not limited to, television dramas, films, musicals, network short dramas, radio dramas, and the like. In response to presence of the film and television resource matching the book, the film and television resource information of the film and television resource may be presented. The film and television resource information may include the film name, the release time, the cast and crew, the film score, the film reviews, etc.

In addition, in order to facilitate the users to read the presented book quickly when they are interested in the presented book, the recommended book window may further present two buttons related to book reading, including two different buttons "Add to bookshelf" and "Read now". In response to the trigger for the "Add to bookshelf" button, the book may be added to the user's bookshelf. In response to the trigger for the "Reading now" button, the book reading page corresponding to the book may be jumped to.

Figure 5:
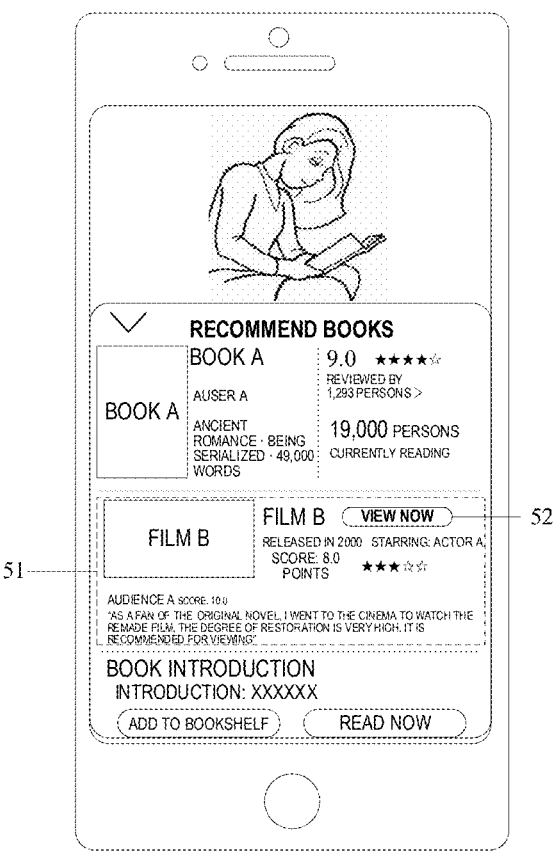
FIG. 5 illustrates a schematic diagram of a second recommended book window according to an embodiment of the present disclosure.

For example, in FIG. 4, for the book "Book A", the corresponding film and television resource may be matched, including a film "Film B", and then the film and television resource information of the film may be correspondingly presented in the recommended book window. Referring to FIG. 5, which is a schematic diagram of a second recommended book window according to an embodiment of the present disclosure. In the schematic diagram, the film and television resource information 51 matching the book is illustrated. In addition, a viewing button 52 for viewing the film and television resource is further illustrated, such that the user may directly jump to the corresponding film and television resource viewing page for viewing by triggering the viewing button 52.

In another possible case, when the determined at least one book includes a plurality of books, the book information corresponding to the plurality of books, such as the cover information of the book, may be presented in the first area of the recommended book window. Since most of the cover information of the book presents the book title of the book, the cover picture and the book title of the book may be presented through picture information. Thus, in the embodiment of the present disclosure, the book cover is selected as the book information presented in the first area. When a plurality of books is arranged in the first area, the arrangement order may be, for example, consistent with or different from the arrangement order between the plurality of books illustrated in FIG. 3, which may be determined according to actual conditions.

In addition, in the second area of the recommended book window, the book introduction information of a book may be presented similarly to the recommended book window illustrated in FIG. 4. As for which book's book information is illustrated, it may be determined in response to the user's selection trigger on any book in the first area. Specifically, when the recommended book window is presented in response to the user's target trigger, the book introduction information of the first book presented in the first area may be first presented. Then, in response to the user's selection trigger, the book introduction information of the corresponding selected book may be switched and presented.

Figure 6:
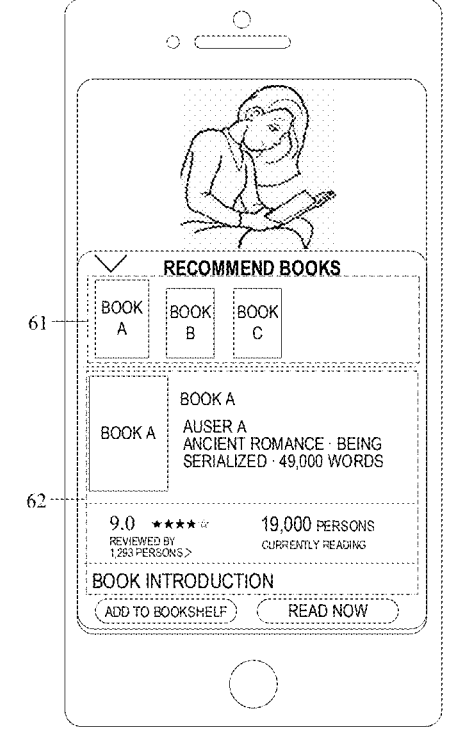
FIG. 6 illustrates a schematic diagram of a third recommended book window according to an embodiment of the present disclosure.

For example, referring to FIG. 6, which is a schematic diagram of a third recommended book window according to an embodiment of the present disclosure. The area 61 is the first area, which is configured to present book covers corresponding to the determined three books respectively. The area 62 is the second area, which is configured to present the book introduction information corresponding to the selected book. In FIG. 6, the selected book is the book A. In order to facilitate the user to easily identify which book's book introduction information is currently presented, in the first area, a book whose book introduction information is being presented may be enlarged and presented, to be distinguished from other books.

In the case where the determined at least one book includes a plurality of books, it is also possible to determine whether there is a target topic corresponding to the plurality of books, and present the target topic on the page on which the target video is played. The correspondence described here may refer to that the presented plurality of books matches the plurality of books under the target topic. Exemplarily, when the target topic is determined, according to the above description, when at least one book is determined, if the second book therein is determined based on the topic, the first book and the second book may have the same topic, and the topic may be taken as the target topic. Alternatively, for the determined at least one book, it is possible to first determine whether one of the books has some topics that mention the book in the plurality of available topics. Then, it is determined, from these selected some topics, whether there is a topic that mentions other books in the at least one book except that book, and the finally selected topic is taken as the target topic.

Figure 7:
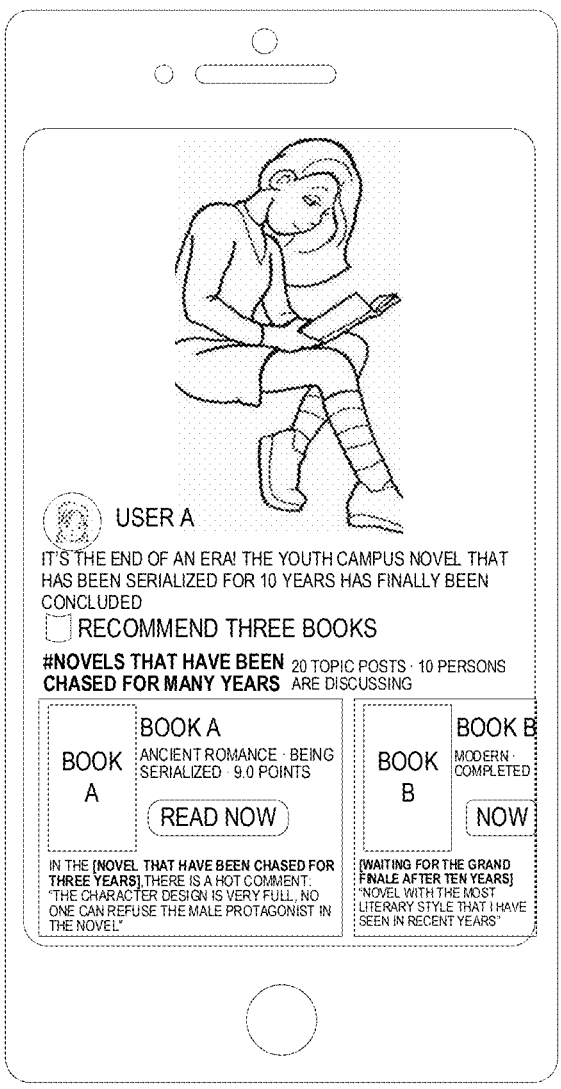
FIG. 7 illustrates a schematic diagram of a further page for playing a target video according to an embodiment of the present disclosure.

In the case where the target topic is determined, when the target video is played, the target topic may be presented on the page on which the target video is played. For example, a schematic diagram of a further page for playing a target video according to an embodiment of the present disclosure is illustrated in FIG. 7. Different from the video play page illustrated in FIG. 3, in FIG. 7, the video play page further presents the target topic determined based on the at least one book. Specifically, when the target topic is presented, the title information of the target topic and the book recommendation information extracted from the plurality of topic posts under the target topic may be presented on the video play page.

For example, in FIG. 7, the title information of the target topic "Novels that have been chased for many years" is presented with "#" as the topic symbol. In addition, the number of topic posts and the number of current discussants in the target topic are presented next to the title information, to attract users to participate in the discussion of the target topic. Since the topic posts involving different books in the target topic may be different, when the extracted book recommendation information is presented, the title of the topic post under the target topic and the book recommendation information in the topic post may be correspondingly presented in the book information card. For example, in FIG. 7, in the book information card corresponding to the "Book A", the title of the topic post involving this book under the target topic is marked with "[ ]", which includes "Novels that have been chased for three years". In addition, the book recommendation information of this book is presented below the title of the topic post, and is specifically marked with a double quotation. In this way, when the book recommendation information of the book is presented, the user may easily know in which topic post under the target topic the book recommendation information is located, and may purposefully view and comment on the topic post under the target topic.

In addition, in the case where the target topic is presented on the page on which the target video is played, when the window for recommending the book is presented in response to the target trigger on the page, the book covers of the plurality of books associated with the target topic and the book introduction information of the selected book in the plurality of books may be presented. In a possible case, for the determined at least one book, after the target topic is determined for it, when there are other books involved in the target topic, then these books and the determined at least one book may be presented in the recommended book window. For specific presentation manners, reference may be made to the description of FIG. 6, and details are not described herein again.

For the block S102, in the case where the target video and the at least one book are determined according to the foregoing embodiments, and the target video is played and the book information of the at least one book is presented, the book reading page corresponding to the book information may be presented in response to a reading trigger for the book information. The book reading page may be configured to provide the user with the book content corresponding to the book, such that the user may read the book completely.

According to the above description, the page on which the target video is played and the recommended book window both present book information of at least one book, and further present the reading trigger button for the corresponding book. For the two presented pages, in addition to setting the book cover and/or the book title as the button that can trigger the reading jump, to present the book reading page corresponding to the book information in response to the user's reading trigger for the book information, it may also present the book reading page corresponding to the book information in response to the trigger on the reading trigger button.

Therefore, for different pages presented, the jump of the book reading page can be easily achieved. That is, no matter which page the user is currently on, the user can easily read the entire content of the book of interest completely, which is more convenient.

Those skilled in the art may understand that, in the specific implementation of the above method, the writing order of the respective steps does not imply the strict execution order and does not constitute any limitation on the implementation process. The specific execution order of respective steps should be determined by its function and possible internal logic.

Based on the same inventive concept, in the embodiments of the present disclosure, an apparatus for presenting information corresponding to the method for presenting information is further provided. Since the principle of solving problems in the apparatus in the embodiments of the present disclosure is similar to the above method for presenting information in the embodiments of the present disclosure, the implementation of the apparatus may refer to the implementation of the method, and repetitions will not be repeated.

Figure 8:
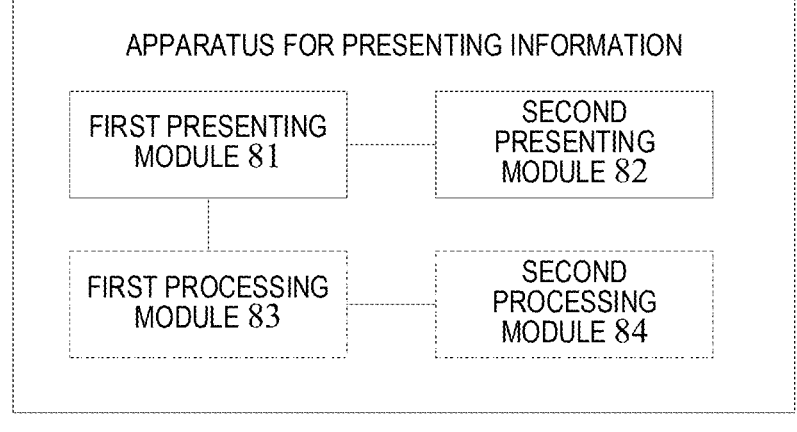
FIG. 8 illustrates a schematic diagram of an apparatus for presenting information according to an embodiment of the present disclosure.

A schematic diagram of an apparatus for presenting information according to an embodiment of the present disclosure is illustrated in FIG. 8. The apparatus includes a first presenting module 81 and a second presenting module 82.

The first presenting module 81 is configured to play a target video and present book information of at least one book. The at least one book includes a first book matching a content of the target video, and/or a second book associated with the first book.

The second presenting module 82 is configured to in response to a reading trigger for the book information, present a book reading page corresponding to the book information.

In an alternative implementation, the first book matching the content of the target video is determined by: extracting content-related information of the target video; and matching the content-related information with the book information of each book in the book library to determine the first book matching the content of the target video. The content-related information includes at least one of title information, comment information, copy information, or content recognition information of the target video.

In an alternative implementation, the second book associated with the first book is determined by: determining, in a book library, a book with corresponding target attribute information matching target attribute information of the first book as the second book; and/or determining a topic to which the first book belongs, and determining a book under the topic in the book library as the second book.

In an alternative implementation, the at least one book is a single book. The information presenting module further includes a first processing module 83. The first processing module 83 is configured to: in response to a target trigger on a page on which the target video is played, present a recommended book window; and present, in the recommended book window, book introduction information of the single book, and in response to presence of film and television resource information matching the single book, present the film and television resource information.

In an alternative implementation, the at least one book includes a plurality of books. The information presenting module further includes a second processing module 84. The second processing module 84 is configured to: in response to the presented plurality of books matching a plurality of books under a target topic, present the target topic on a page on which the target video is played; and in response to a trigger for the target topic, present a plurality of topic posts under the target topic. The topic posts include discussion information for a book under the target topic.

In an alternative implementation, when the second processing module 84 presents the target topic on the page on which the target video is played, the second processing module 84 is configured to: present, on the page on which the target video is played, title information of the target topic and book recommendation information extracted from the plurality of topic posts under the target topic.

In an alternative implementation, the second processing module 84 is further configured to: in response to a target trigger on the page on which the target video is played, present a recommended book window; and present, in the recommended book window, book covers of a plurality of books associated with the target topic and book introduction information of a selected book in the plurality of books.

In an alternative implementation, the first presenting module 84 is configured to, when the target video is played, in response to a trigger on a video preview card of the target video presented on a recommendation page, play the target video. The recommendation page presents video preview cards of a plurality of recommendation videos including the video preview card of the target video. An arrangement order between the video preview cards of the plurality of recommendation videos is related to consumption data of books respectively associated with the plurality of recommendation videos. The video preview card presents video preview information of the target video and book recommendation information of at least one book associated with the target video.

For the process flow of respective modules in the apparatus and the description of the interaction flow between the respective modules, reference may be made to the relevant descriptions in the above method embodiments, and will not be described in detail here.

Figure 9:
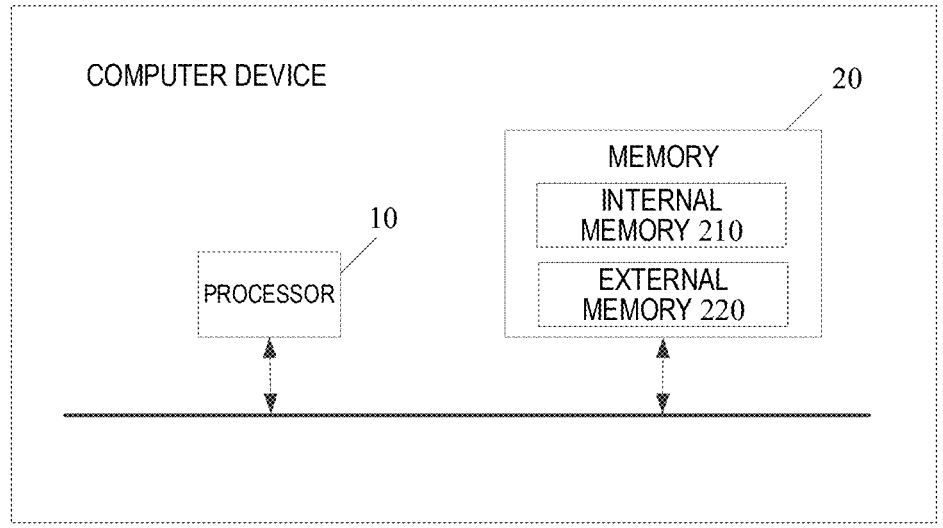
FIG. 9 illustrates a schematic diagram of a computer device according to an embodiment of the present disclosure.

Embodiments of the present disclosure further provide a computer device, as illustrated in FIG. 9, which is a schematic diagram of a computer device according to an embodiment of the present disclosure.

The computer device includes a processor 10 and a memory 20. The memory 20 stores machine readable instructions executable by the processor 10, the processor 10 is configured to execute the machine readable instructions stored in the memory 20. The machine readable instructions, when executed by the processor 10, the processor 10 performs: playing a target video, and presenting book information of at least one book; and in response to a reading trigger for the book information, presenting a book reading page corresponding to the book information. The at least one book includes a first book matching a content of the target video, and/or a second book associated with the first book.

The memory 20 includes an internal memory 210 and an external memory 220. The internal memory 210 herein is also referred to as the internal storage for temporarily storing operation data in the processor 10, and data exchanged with the external memory 220 such as a hard disk. The processor 10 exchanges data with the external memory 220 through the internal memory 210.

For the specific execution process of the foregoing instruction, reference may be made to the steps of the method for presenting information described in the embodiments of the present disclosure, and details are not described herein again.

Embodiment of the present disclosure further provide a computer-readable storage medium. The computer-readable storage medium stores a computer program, and when the computer program is run by a processor, the acts of the method for presenting information in the foregoing method embodiments are performed. The storage medium may be a volatile or non-volatile computer readable storage medium.

Embodiment of the present disclosure further provides a computer program product. The computer program product carries a program code, and the program code includes instructions that may be used to perform the acts of the method for presenting information described in the foregoing method embodiments.

The computer program product may be specifically implemented by hardware, software, or a combination thereof. In an alternative embodiment, the computer program product is embodied as a computer storage medium. In another alternative embodiment, the computer program product is embodied as a software product, for example, a software development kit (SDK).

Those skilled in the art may clearly understand that, for the convenience and brevity of description, the specific working process of the system and the apparatus described above may refer to the corresponding processes in the foregoing method embodiments, and details are not described herein again. In several embodiments provided by the present disclosure, it should be understood that the disclosed systems, apparatuses, and methods may be implemented in other manners. The apparatus embodiments described above are merely illustrative, for example, the division of the units is merely a logical function division, and in actual implementation, there may be another division manner. For example, multiple units or components may be combined or may be integrated into another system, or some features may be ignored, or not executed. Alternatively, the mutual coupling or direct coupling or communication connection illustrated or discussed may be an indirect coupling or communication connection through some communication interfaces, devices, or units, and may be in electrical, mechanical, or other forms.

The units described as separate components may or may not be physically separate, and components presented as units may or may not be physical units, that is, may be located in one place, or may be distributed to multiple network units. Some or all of the units may be selected according to actual needs to achieve the purpose of the solution of this embodiment.

In addition, each functional unit in the embodiments of the present disclosure may be integrated into one processing unit, or may be separately physically present by each unit, or may be integrated in one unit by two or more units.

The functions, if implemented in the form of software functional units and sold or used as separate products, may be stored in a non-transitory computer-readable storage medium that is executable by a processor. Based on such an understanding, the technical solution of the present disclosure essentially or a part contributing to the prior art or a part of the technical solution may be embodied in the form of a software product, and the computer software product is stored in a storage medium and includes several instructions to enable a computer device (which may be a personal computer, a server, or a network device) to perform all or part of the steps of the method in the embodiments of the present disclosure. The foregoing storage medium includes a USB flash disk, a mobile hard disk, a read-only memory (ROM), a random access memory (RAM), a magnetic disk or an optical disk, and various media that can store program code.

Finally, it should be noted that the above embodiments are only specific embodiments of the present disclosure, to illustrate the technical solutions of the present disclosure, and not to limit the technical solutions of the present disclosure, and the protection scope of the present disclosure is not limited thereto, although the present disclosure is described in detail with reference to the foregoing embodiments, those skilled in the art should understand that any skilled in the art may still modify or conceivably change the technical solutions described in the foregoing embodiments, or equivalently replace some of the technical features; and these modifications, changes, or replacements do not make the essence of the corresponding technical solutions fall within the protection scope of the embodiments of the present disclosure. Therefore, the protection scope of the present disclosure should be based on the protection scope of the claims.

What is claimed is:

1. A method for presenting information, comprising:
playing a target video, and presenting book information of at least one book, wherein the at least one book comprises a first book matching a content of the target video, and/or a second book associated with the first book, wherein the at least one book corresponds to a topic, and the topic is presented on a page on which the target video is played; and
in response to a reading trigger for the book information, presenting a book reading page corresponding to the book information,
wherein in response to a trigger for the topic, a plurality of topic posts under the topic are presented, the topic posts comprising discussion information for a book under the topic.

2. The method of claim 1, wherein the first book matching the content of the target video is determined by:
extracting content-related information of the target video, the content-related information comprising at least one of title information, comment information, copy information, or content recognition information of the target video; and matching the content-related information with the book information of each book in a book library, to determine the first book matching the content of the target video.

3. The method of claim 1, wherein the second book associated with the first book is determined by:

determining, in a book library, a book with corresponding target attribute information matching target attribute information of the first book as the second book; and/or determining the topic to which the first book belongs, and determining a book under the topic in the book library as the second book.

4. The method of claim 1, wherein the at least one book is a single book; and the method further comprises:

in response to a target trigger on a page on which the target video is played, presenting a recommended book window; and presenting, in the recommended book window, book introduction information of the single book, and in response to presence of film and television resource information matching the single book, presenting the film and television resource information.

5. The method of claim 1, wherein the at least one book comprises a plurality of books;

the method further comprising:

in response to the presented plurality of books matching a plurality of books under the topic, presenting the topic on the page on which the target video is played.

6. The method of claim 5, wherein presenting the target topic on the page on which the target video is played comprises:

presenting, on the page on which the target video is played, title information of the target topic and book recommendation information extracted from the plurality of topic posts under the target topic.

7. The method of claim 5, further comprising:

in response to a target trigger on the page on which the target video is played, presenting a recommended book window; and presenting, in the recommended book window, book covers of a plurality of books associated with the target topic and book introduction information of a selected book in the plurality of books.

8. The method of claim 1, wherein playing the target video comprises:

in response to a trigger on a video preview card of the target video presented on a recommendation page, playing the target video;

the recommendation page presenting video preview cards of a plurality of recommendation videos comprising the video preview card of the target video; an arrangement order between the video preview cards of the plurality of recommendation videos being related to consumption data of books respectively associated with the plurality of recommendation videos; the video preview card presenting video preview information of the target video and book recommendation information of at least one book associated with the target video.

9. A computer device, comprising: a processor and a memory, the memory storing machine readable instructions executable by the processor, the processor being configured to execute the machine readable instructions stored in the memory, and when the machine readable instructions are executed by the processor, the processor performing acts comprising:

playing a target video, and presenting book information of at least one book, wherein the at least one book comprises a first book matching a content of the target video, and/or a second book associated with the first book, wherein the at least one book corresponds to a topic, and the topic is presented on a page on which the target video is played; and in response to a reading trigger for the book information, presenting a book reading page corresponding to the book information, wherein in response to a trigger for the topic, a plurality of topic posts under the topic are presented, the topic posts comprising discussion information for a book under the topic.

10. The computer device of claim 9, wherein the first book matching the content of the target video is determined by:

extracting content-related information of the target video, the content-related information comprising at least one of title information, comment information, copy information, or content recognition information of the target video; and matching the content-related information with the book information of each book in a book library, to determine the first book matching the content of the target video.

11. The computer device of claim 9, wherein the second book associated with the first book is determined by:

determining, in a book library, a book with corresponding target attribute information matching target attribute information of the first book as the second book; and/or determining the topic to which the first book belongs, and determining a book under the topic in the book library as the second book.

12. The computer device of claim 9, wherein the at least one book is a single book; and the acts further comprises:

in response to a target trigger on a page on which the target video is played, presenting a recommended book window; and presenting, in the recommended book window, book introduction information of the single book, and in response to presence of film and television resource information matching the single book, presenting the film and television resource information.

13. The computer device of claim 9, wherein the at least one book comprises a plurality of books;

the acts further comprising:

in response to the presented plurality of books matching a plurality of books under the topic, presenting the topic on the page on which the target video is played.

14. The computer device of claim 13, wherein presenting the target topic on the page on which the target video is played comprises:

presenting, on the page on which the target video is played, title information of the target topic and book recommendation information extracted from the plurality of topic posts under the target topic.

15. The computer device of claim 13, wherein the acts further comprising:

in response to a target trigger on the page on which the target video is played, presenting a recommended book window; and presenting, in the recommended book window, book covers of a plurality of books associated with the target topic and book introduction information of a selected book in the plurality of books.

16. The computer device of claim 9, wherein playing the target video comprises:

in response to a trigger on a video preview card of the target video presented on a recommendation page, playing the target video;

the recommendation page presenting video preview cards of a plurality of recommendation videos comprising the video preview card of the target video; an arrangement order between the video preview cards of the plurality of recommendation videos being related to consumption data of books respectively associated with the plurality of recommendation videos; the video preview card presenting video preview information of the target video and book recommendation information of at least one book associated with the target video.

17. A non-transitory computer-readable storage medium, wherein the computer-readable storage medium stores a computer program, and when the computer program is executed by a computer device, the computer device performs acts comprising:

playing a target video, and presenting book information of at least one book, wherein the at least one book comprises a first book matching a content of the target video, and/or a second book associated with the first book, wherein the at least one book corresponds to a topic, and the topic is presented on a page on which the target video is played; and in response to a reading trigger for the book information, presenting a book reading page corresponding to the book information, wherein in response to a trigger for the topic, a plurality of topic posts under the topic are presented, the topic posts comprising discussion information for a book under the topic.

18. The non-transitory computer-readable storage medium of claim 17, wherein the first book matching the content of the target video is determined by:

extracting content-related information of the target video, the content-related information comprising at least one of title information, comment information, copy information, or content recognition information of the target video; and matching the content-related information with the book information of each book in a book library, to determine the first book matching the content of the target video.

19. The non-transitory computer-readable storage medium of claim 17, wherein the second book associated with the first book is determined by:

determining, in a book library, a book with corresponding target attribute information matching target attribute information of the first book as the second book; and/or determining the topic to which the first book belongs, and determining a book under the topic in the book library as the second book.

20. The non-transitory computer-readable storage medium of claim 17, wherein the at least one book is a single book; and the acts further comprises:

in response to a target trigger on a page on which the target video is played, presenting a recommended book window; and presenting, in the recommended book window, book introduction information of the single book, and in response to presence of film and television resource information matching the single book, presenting the film and television resource information.

\* \* \* \* \*